United States Patent
Glunk et al.

[15] 3,656,286
[45] Apr. 18, 1972

[54] MOWING MACHINE

[72] Inventors: Joseph Glunk, Schiener-Berg-Stra. 11; Heinz Gnadler, Steinerweg 6, both of 7702 Gottmadingen, Germany

[22] Filed: Oct. 30, 1970

[21] Appl. No.: 85,505

[52] U.S. Cl. .................................................56/294
[51] Int. Cl. .......................................A01d 55/18
[58] Field of Search....................56/295, 503, 255, 6, 192

[56] References Cited

UNITED STATES PATENTS

| | | | |
|---|---|---|---|
| 3,389,539 | 6/1968 | Zweegers | 56/6 |
| 3,391,522 | 7/1968 | Zweegers | 56/6 |
| 3,395,522 | 8/1968 | Zweegers | 56/295 |

*Primary Examiner*—Russell R. Kinsey
*Attorney*—Karl F. Ross

[57] ABSTRACT

A mowing machine having at least one mower assembly with rotary blade means driven by a motor or the like and an upright shaft upon which the blade assembly is journaled. The blade assemblies are each supported by an upwardly concave dished disk glide or skid having a generally flat surface parallel to the ground in its central region and extending upwardly and outwardly with uniform light curvature. The rim of the dish is bent outwardly in a flange parallel to the ground surface so that the slide or skid is stiffened.

10 Claims, 2 Drawing Figures

Josef Glunk
Heinz Gnadler
INVENTORS.

BY

Karl F. Ross
Attorney 3,656,286

MOWING MACHINE

FIELD OF THE INVENTION

Our present invention relates to mowers for agricultural crops, domestic crops and the like, e.g. grasses for commercial, decorative or other purposes. More particularly our invention relates to rotary-blade mowers in which the blades of a mower assembly are rotatable about an upright axis.

BACKGROUND OF THE INVENTION

Mowing machines which are self-propelled, are pushed by the user or are drawn or pushed by a vehicle, have been employed heretofore both for the cutting of lawns and grass areas for esthetic purposes and in order to clear unsightly regions and for the mowing of crops of agricultural plots.

Basically, three types of mowers are available, including sickle-bar mowers in which a plurality of blades are mounted upon a reciprocating bar which co-operates with fixed teeth on a support for the reciprocating bar to sever crop material entering the throat between the teeth as the sickle bar is drawn, carried or pushed across the field. Another type of mower, commonly known as a "reel mower" makes use of a cutting drum having helical cutting blades which co-operate with a shear bar lying generally across a generatrix of the drum. The drum may be driven by a coupling which connects it to the wheels of the vehicle upon which it is carried, or by a motor on this vehicle or upon another vehicle drawing the reel mower.

Finally, mowers have been provided with rotary blade assemblies wherein the blades extend approximately parallel to the ground surface, may be carried by a blade drum, and are rotated at high speeds about an axis which is generally upright. While some rotary blade systems merely use a vertical shaft from which angularly spaced blades extend generally radially close to the ground plane, other rotary blade mowers affix the blades to an apron or cutter plate extending outwardly from a drum which is, in turn, journaled upon the support structure and is driven by a motor. Motors of the latter type may be mounted on agricultural or garden tractors, may be constituted as towed implements by providing a number of assemblies on a common support drawn by the tractor, and may be provided individually or in pairs in manually displaceable mowing arrangements.

The present invention is directed to improvements in mower assemblies of the rotary-blade type wherein, particularly, the blades are carried by an upright mower drum. The drum structure blade configuration, drive means and support structure may be those described in the commonly assigned copending application Ser. No. 62,967, filed Aug. 11, 1970 and entitled "Mower."

In conventional rotary-blade mowers, it has been proposed to support the implement at each of the mower assemblies by providing a ground-engaging member located within the orbit of the respective blades. This member has generally been a skid provided with a downwardly concave configuration and a small radius of curvature in the region around the concavity. As a result, the support did not slide satisfactorily upon the ground, was highly sensitive to wear, did not distribute the weight of the mower over sufficient ground area, and was unsatisfactory in other respects as well.

OBJECTS OF THE INVENTION

It is the principal object of the present invention to provide an improved blade mower of the general character described.

Another object of our invention is to provide a mower arrangement having individual supports for the mower assemblies of improved construction.

SUMMARY OF THE INVENTION

These objects and others will become apparent hereinafter are attained, in accordance with our present invention, in a rotary-blade mower in which the mower assembly comprises an upright support shaft having a dished-disk support skid or glider on the rear end thereof and rotatably carrying a cutter-blade arrangement comprising a drum having a downwardly and outwardly inclined frustoconical apron and blades extending generally radially therefrom. The skid has a circular plan configuration and preferably extends beyond the outer periphery of the frustoconical cutter plate for restricting possible danger to the underside of the mower assembly by stones and other rigid matter which may be cast up by the blades. The disk, moreover, has a flat central portion parallel to the ground plane and resting thereon over substantially the entire area and an upwardly and outwardly extending outer portion of light curvature. The annular rim of the disk is bent outwardly parallel to the ground plane to stiffen the disk.

It will be apparent, therefore, that the invention resides in a support skid or disk having a central support surface parallel to the ground and merging smoothly into a lightly curved, upwardly extending outer portion whose rim is bent parallel to the central portion and outwardly. The outwardly bent rim imparts to the skid additional stiffness and structural integrity, while the large radius of curvature of the arcuate portion improves the ability of the skid to ride over the various ground contours.

Moreover, the large-area contact of the central portion of the skid with the ground distributes the load of the mower over a greater area and thereby reduces the danger of localized wear.

The outer diameter of the support disk is at least equal to the diameter of the cutter plate provided at the bottom of the cutter assembly and carrying, on its underside, the cutting blades. This provides protection of the blade mounting against stones cast up during the mowing process. The blade mounting is described and claimed in our concurrently filed, commonly assigned copending application Ser. No. 85504 filed Oct. 10, 1970, entitled "Swinging Blade Arrangement for Mower Assembly."

To reduce or limit wear at the central portion of the disk (at which it is attached to the nonrotatable support shaft), we have found it to be advantageous to press the region axially aligned with the support shaft somewhat inwardly.

DESCRIPTION OF THE DRAWING

The above and other objects, features and advantages of the present invention will become more readily apparent from the following description, reference being made to the accompanying drawing in which.

SPECIFIC DESCRIPTION

Figure 1:
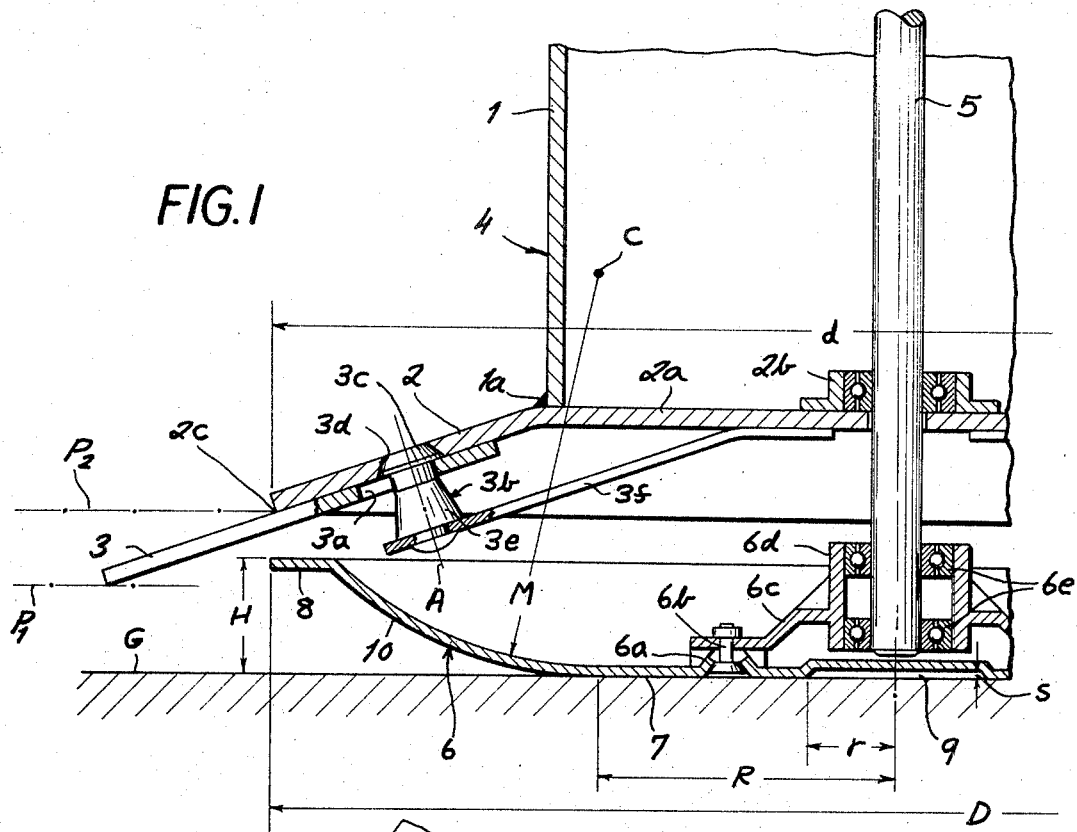
FIG. 1 is a fragmentary vertical cross-sectional view through a portion of the mower assembly, according to the invention.
Figure 2:
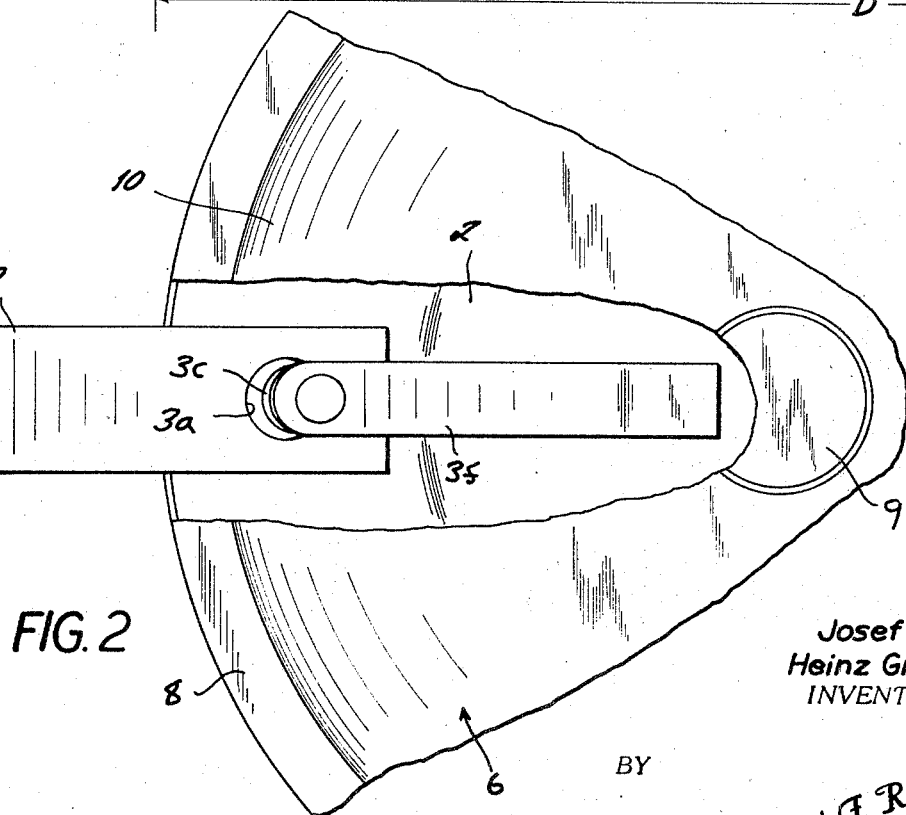
FIG. 2 is a bottom plan view thereof.

In the drawing, we show the mower assembly, in part, which may be driven as described in the aforementioned copending application Ser. No. 62,967 and is generally mounted together with a number of similar assemblies on a common support towed by or mounted upon a tractor. The cutting assembly 4 is journaled upon a fixed vertical shaft 5 and comprises a mowing drum 1 welded at 1a to a downwardly and outwardly diverging frustoconical cutting blade support plate 2. The top of the cutting blade support plate 2 is formed with a horizontal hub 2a carrying one of the bearing assemblies 2b by which the drum 1 is journaled on the shaft 5. At the lower end of the shaft 5, which projects into the space surrounded by the cutting blade support plate 2, we provide an upwardly concave, downwardly convex dished-disk skid which is represented generally at 6. At angularly equispaced bosses 6a formed internally of the disk, rivets 6b secure the disk to a spider 6c having a sleeve 6d carrying a pair of bearings 6e by which the member 6 is mounted upon the shaft 5 but is permitted to rotate relative thereto.

In the region of the central zone 7 of the plate 6, the disk is planar and rests upon the ground surface G. The radius $R - r$ of this planar portion is such that the planar surface area ranges between one-fourth and two-thirds of the total area of the underside of the disk. The diameter D of the disk 6, moreover, exceeds or is at least equal to the diameter $d$ of the cutting blade support plate 2.

From the planar portion 7, the disk 6 curves upwardly and outwardly with a curvature corresponding to a surface of revolutions and a radius of curvature M which exceeds the axial height H of the disk and is preferably two to 10 times this height. Advantageously, the center of curvature C of the arc in the vertical plane defining the curvature of zone 10 is located at the distance R from the axis of rotation of the drum where R ranges between 1.5 and 10 times the height H.

The curved portion 10 extends unitarily into the rim flange 8 which lies parallel to the plane of the central portion 7 and advantageously is disposed above the horizontal plane $P_1$ of the free ends of the blades 3 but below the horizontal plane $P_2$ of the lower rim of the plate 2. Centrally of the skid 6 we provide a small depression 9 with a depth $s$ equal approximately to the thickness of the sheet metal from which the skid is stamped and centered on the axis of the shaft 5.

The blades 3 are provided with enlarged openings $3a$ accommodating a pin $3a$ which permits the blade to swing about blade axis A. The pin $3b$ is provided with a frustoconical portion $3c$ fitted into a complementary recess $3d$ in the underside of the plate 2. A frustoconical portion $3e$ of the pin, moreover, tends to urge the blade 3 upwardly when the apparatus is in motion and is, in turn, anchored to a leaf spring $3f$ fixed to the web $2a$. Should the blade require changing, the spring $3f$ (which is spaced from the plate 2 by a distance of at least four times the blade thickness) is depressed to withdraw the head $3c$ from the recess $3d$ and permit the blade to be removed via its opening $3a$ which is large than the largest diameter of the pin. Furthermore, should the blade strike a mound of earth, a rock or other damaging surface, the blade may be deflected downwardly or even upwardly with a fulcrum at the edge $2c$ against the restoring force of the spring $3f$, thereby preventing breakage or damage to the blades.

The improvement described and illustrated is believed to admit of many modifications within the ability of persons skilled in the art, all such modifications being considered within the spirit and scope of the invention except as limited by the appended claims.

We claim:

1. A rotary blade mower comprising a mower body rotatable about a substantially vertical axis; blade means carried by said body and extending outwardly therefrom at the lower end of said body; a shaft supporting and extending axially of said body therebelow and within the orbit of said blade means; and an upwardly concave dished-disk support skid mounted on said support shaft and engaging the ground, said skid having a central planar surface adapted to be in contact with the ground, an upwardly and outwardly curved outer portion of large radius of curvature, and a rim extending outwardly and coplanar with the central portion.

2. The mower defined in claim 1 wherein said dished-disk skid is circular and said body is provided with a downwardly and outwardly divergent frustoconical plate carrying said blade means, said skid having an outer diameter at least equal to the outer diameter of said plate.

3. The mower defined in claim 2 wherein said skid is composed of sheet metal and is recessed inwardly in axial alignment with said shaft.

4. The mower defined in claim 3, further comprising means within said skid for rotatably mounting same upon said shaft.

5. The mower defined in claim 4 wherein said blade means includes a plurality of blades mounted on said blade and extending downwardly and outwardly therefrom, said blades having free ends lying in a first horizontal plane below said rim and said plate having a lower edge lying in a second horizontal plane above said rim.

6. The mower defined in claim 5 wherein said skid has an axial height H and said outer portion has a radius of curvature equal approximately from 2H to 10H.

7. The mower defined in claim 6, further comprising means for swingably mounting said blades along the inner surface of said plate.

8. The mower defined in claim 7 wherein the last-mentioned means includes a pin swingably supporting each of said blades, and a respective leaf spring carrying said pin and fixed to said plate but spaced therefrom in the region of the pin by at least four times the thickness of said blade.

9. The mower defined in claim 8 wherein said plate is provided with an inwardly open recess at each of said blades, each of said pins being biased by its leaf spring into a respective recess.

10. The mower defined in claim 9 wherein said body is a cylindrical drum.

* * * * *